Dec. 8, 1931.  W. M. SHEEHAN  1,835,673
CAB UNDERFRAME
Filed Jan. 17, 1930  2 Sheets-Sheet 1
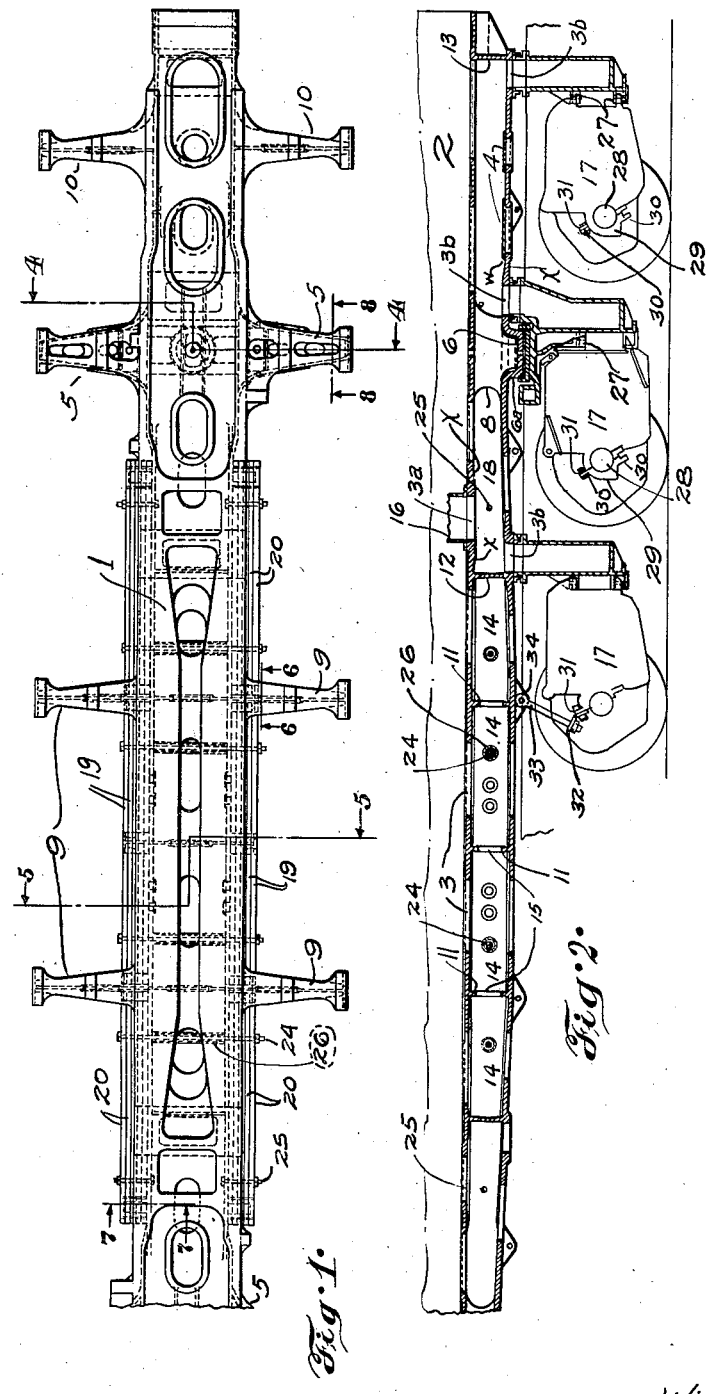
Inventor
William M. Sheehan
By Rodney Bedell
Attorney Dec. 8, 1931.  W. M. SHEEHAN  1,835,673
CAB UNDERFRAME
Filed Jan. 17, 1930  2 Sheets-Sheet 2
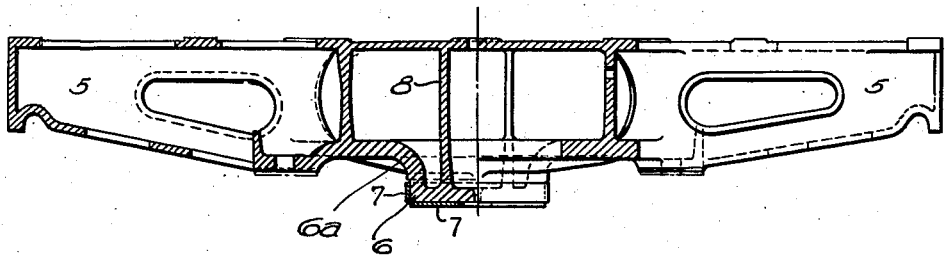
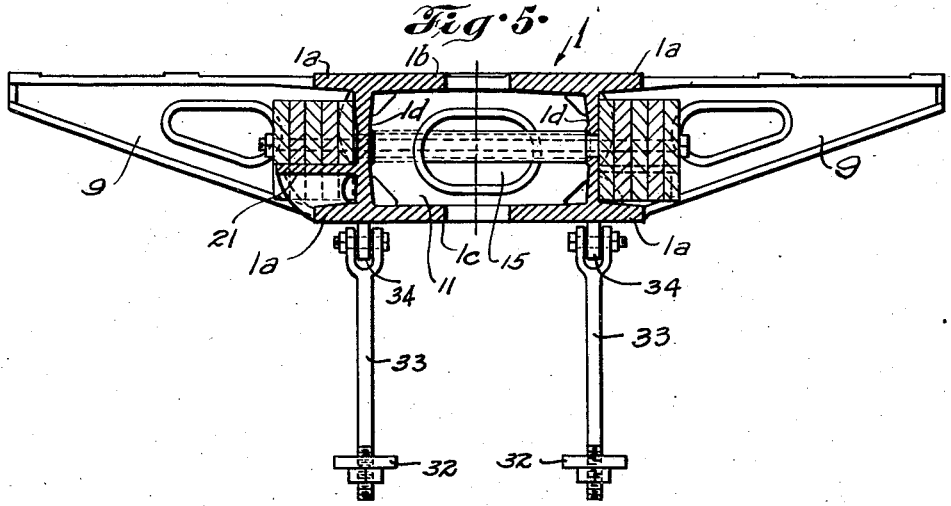
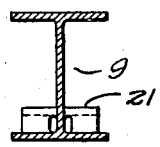
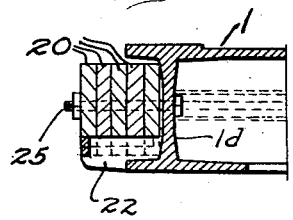
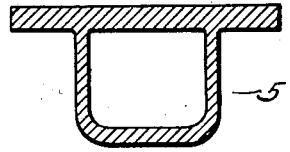
Inventor
William M. Sheehan
By Rodney Bedell
Attorney Patented Dec. 8, 1931

1,835,673

UNITED STATES PATENT OFFICE

WILLIAM M. SHEEHAN, OF ST. LOUIS, MISSOURI, ASSIGNOR TO GENERAL STEEL CASTINGS CORPORATION, OF GRANITE CITY, ILLINOIS, A CORPORATION OF DELAWARE

CAB UNDERFRAME

Application filed January 17, 1930. Serial No. 421,451.

My invention relates to railway rolling stock and more particularly to electric locomotives and consists in a novel cab underframe adapted to be mounted upon suitable truck structure and to support the cab structure and mechanism contained therein.

In a locomotive of this type there is a great mass in the cab, the center of gravity of which is a considerable distance above the rails. The inertia of this mass when suddenly brought to rest as by an emergency brake application produces very high longitudinal stresses in the cab frame, particularly in the vicinity of truck center plates. My underframe is arranged to resist such stresses.

I also desire to use the cab underframe as an air conduit and the interior of the conduit must be such as to reduce as much as possible the resistance to air movement.

The depth of the cab underframe is greatly restricted by the necessity of passing over the truck center plates and by the necessity of providing for a predetermined height of cab which must not project too high or it will exceed clearance limits prescribed by tunnels, transmission lines, etc. To meet these conditions with a built-up structure, it would be necessary to increase the width of the main central member of the underframe to such an extent that the motors would be inaccessible for inspection and repairs. A unitary structure, such as I disclose herein, makes possible the use of adequately thickened sections, where strength is required, without laminated structure or areas weakened by rivet holes and without undue widening of the main member of the underframe to secure the necessary strength.

The main objects of my invention are to provide a rigid, economical underframe structure strong enough to carry the cab load between the widely spaced supporting points on the truck structure to take care of the other forces applied to the locomotive frame, and to utilize the underframe structure to carry ballast to secure the desired weight at rail in the form of bulk material and also in the form of metal slabs or bars, and also to utilize the underframe structure for air passages conducting air from the cab to points adjacent the motors mounted on the truck. Preferably, these objects are attained by the formation of a unitary casting comprising a central box shaped member with lateral extensions at intervals for supporting the cab and additional brackets for carrying ballast bars.

Various details embodied in the general structure are described below and constitute additional features of my invention.

In the accompanying drawings which illustrate a selected embodiment of my invention—

Figure 1 is a top view of my novel underframe showing ballast bars applied thereto.

Figure 2 is a longitudinal vertical section taken on the center line of the underframe and indicating the cab superstructure and some of the associated truck structure.

Figure 3 is a side view of the same.

Figures 4 and 5 are vertical transverse sections taken on the lines 4—4 and 5—5, respectively, of Figure 1.

Figures 6, 7 and 8 are vertical sections of detailed structure and are taken on lines 6—6, 7—7 and 8—8, respectively, of Figure 1.

The main member 1 of the underframe is in the form of a hollow section, preferably box-shaped, having upper and lower flanges $1^a$ projecting outwardly from the body of the member. The member has an upper wall $1^b$; a lower wall $1^c$ and side walls $1^d$. Member 1 is provided with a number of openings 3 for the purpose of lightening the casting and facilitating the molding and casting and cleaning operations. Most of these openings will be closed when the device is completed by the application of suitable plates 4 which may be welded to the walls of the casting as indicated at W.

Box-shaped members 5 extend transversely from the central member 1 and form, with the adjacent parts of the central member, a bolster structure. A cylindrical center plate portion 6, to which renewable wear plates 7 may be applied, is united with members 1 and 5 by arcuate elements $6^a$ which merge with the center plate walls and with the bottom walls of the bolster and main sill members. As the weight of the underframe and the entire load thereon is supported from these center plate portions, the box-shaped main member 1 is reinforced adjacent to the center plate portions by means of vertical webs 8 disposed longitudinally of member 1 and extending a short distance on each side of the center line of the bolster, and these webs cause the entire structure to act in opposing longitudinal forces applied at the center pin.

Other lateral projections 9 are provided on member 1 intermediate bolsters 5 for supporting the cab underframe. These projections 9 are preferably I-shaped in cross section (Figure 6) with a single plate-like upper element disposed horizontally and projecting from the upper wall of member 1 and a single plate-like lower element projecting from the lower wall of member 1, the plate-like elements being united by the vertical web of the section and the space between the projections opening outwardly and being free of outer sills whereby access to the trucks and motors is facilitated. Similar projections 10 are provided between each bolster and the adjacent end of the underframe and serve to mount the end portions of the cab superstructure.

The main central member 1, as illustrated, is divided into a series of longitudinal compartments by suitable transverse webs 11, 12 and 13. One or more of the intermediate compartments 14 may receive ballast material, such as a mixture of concrete and scrap iron, which will be held against shifting movement longitudinally of the frame by webs 11, although the latter are not solid but have substantial openings as indicated at 15.

Webs 12 and 13 are preferably imperforate and form, with the side and top walls of the member, air passageways 18 leading from an opening 3$^a$ in the upper wall, immediately below the blower housing 16, to openings 3$^b$ in the lower wall immediately over tubular members provided on the truck structure and adapted to direct air streams to the motors 17 to cool the latter according to the usual practice. Webs 8 are positioned in passageways 18 in a manner which offers the least resistance to the flow of air therethrough.

The openings in the top and bottom walls 1$^b$ and 1$^c$ for admission and exit of the air currents are of such width that, in order to maintain the desired sectional area of the member 1 at these openings, I increase the thickness of these walls, tapering the same as indicated at X and gradually merging the thicker sections with the thinner sections so as to eliminate localization or concentration of stresses, at the same time utilizing walls comprising a single plate or layer of metal. While a built-up structure might have additional plates or other structural elements riveted to the main member adjacent to these openings, such construction would result in a laminated structure and the reduction from a greater thickness to a less thickness would be effected by a series of steps. All this would necessitate a greater quantity of metal and a more substantial amount of labor than is required when the unitary structure, which I have described, is used.

Similarly, the vertical webs 1$^d$ of the main member are thickened where they merge with the heavier horizontal walls, thus affording the most efficient disposition of metal and avoiding laminations present in built-up structures.

Ballast, in addition to that contained within member 1, may be carried on the underframe in the form of bars or slabs 19 and 20 and, to facilitate the carrying of these bars, I provide transverse members 9 with suitable brackets 21 and provide relatively short brackets 22 on the side wall of member 1 intermediate members 9 and brackets 23 between members 9 and the bolsters 5.

Each of these brackets provides a horizontal surface above the bottom of the underframe with depending reinforcing ribs merging with the lower flanges of the underframe. The ends of bars 19 are notched on their underside to rest on brackets 21 and intermediate their ends are notched to fit over brackets 22. Bars 20 are similarly notched to fit over brackets 21 and 23. Bars 19 and 20 and brackets 22 and 23, respectively, have interengaging vertical surfaces which serve to position the bars longitudinally of the frame and prevent the transmission to transverse members 9 of longitudinal forces resulting from inertia or momentum of the ballast bars. Bolts 24 and 25 serve as retaining elements for the bars. Bolts 24 extending through the ballast compartments 14 are preferably provided with enclosing sleeves 26 which facilitate the application and removal of the bolts after ballast has been inserted in the compartments. Bolts 25 extend through the side wall of member 1 only and offer a minimum resistance to the flow of air through the air conduits 18.

An additional feature of my invention is the provision of means for supporting the motors when the truck axles are to be removed. Each motor 17 is supported at one end upon suitable brackets 27 provided on the truck structure and at its opposite end is supported by the axle 28 which the motor drives. The motor bearing on the axle comprises a removable cap 29 having flanges 30 by which it is secured to corresponding flanges 31 on the motor housing. Upon removal of cap 29, a plate 32 may be bolted to flange 31 and the motor may be suspended by means of plate 32 and a link 33 pivoted on a suitable bracket 34 formed integrally with the main member 1 of the underframe. Preferably, brackets 34, links 33 and plates 32 are duplicated on opposite sides of the center line of the underframe as shown in Figure 5. This feature eliminates the necessity of removing the motor from the truck or of blocking up the motor from the ground when it is necessary to remove the wheels and axle.

While I have illustrated my invention in the form of a one-piece casting, certain parts of which are rectangular in cross section and other parts of which preferably have an I-beam cross section, this specific structure is not essential to many features of my invention which may be embodied in a built-up structure or in welding together into an integral whole of several separately formed parts. Obviously, variations in the shapes of the cross sections and other modifications in the details of my structure may be made without departing from the spirit of my invention and I contemplate the exclusive use of such changes as come within the scope of my claims.

I claim:

1. In an underframe for an electric locomotive cab, a main central member of box-shaped cross section having spaced center plate portions and extending substantially throughout the length of the cab to carry the entire weight of the locomotive between said center plate portions, spaced bolster elements of box-shaped cross section extending transversely from said central member, and I-shaped elements extending transversely from said central member intermediate said bolster elements, said elements forming exclusive supports for the sides of the cab, all of said parts constituting an integral structure.

2. In a cab underframe for an electric locomotive, a bolster, a box-like center member extending on opposite sides of said bolster, said member including elements comprising an air conduit leading from an inlet on one side of said bolster to an outlet on the other side of said bolster.

3. In a cab underframe for an electric locomotive, a bolster and a hollow member extending from said bolster towards the end of the underframe and forming part of the main structural element of the underframe and comprising an air conduit intermediate said bolster and the end of the underframe.

4. In a cab underframe for an electric locomotive, a bolster including a center plate portion, a hollow longitudinal member forming an air conduit extending on both sides of said bolster, there being a vertical reinforcement in said member over said center plate portion and disposed longitudinally of the air conduit to avoid undue obstruction to the air currents passed therethrough.

5. In a cab underframe for an electric locomotive, a hollow center member including transverse partitions dividing said member into separate compartments forming a ballast chamber throughout a portion of the length of said member and forming an air conduit throughout another portion of said member.

6. In a cab underframe for an electric locomotive, a box-like central member extending substantially from end to end of the cab structure and divided substantially throughout its length into separate compartments forming one or more ballast chambers and an air conduit at each end of said chamber or chambers.

7. In a cab underframe for an electric locomotive, a hollow central member extending substantially throughout the length of the underframe and divided into a plurality of compartments forming ballast chambers and air conduits respectively.

8. In an underframe for an electric locomotive, a main central member, spaced elements extending transversely from said member, and ballast bars positioned outside of said member and extending between said elements with the ends of said bars supported on said elements.

9. In an underframe for an electric locomotive cab, a main central member, lateral projections thereon for supporting the cab, and brackets integral with said projections and spaced above the bottom thereof for carrying ballast bars.

10. In an underframe for an electric locomotive cab, a main central member, lateral projections thereon for supporting the cab, and brackets integral with said projections and spaced above the bottom thereof for carrying ballast bars, there being depending reinforcing ribs for said brackets merging with the lower portions of said projections.

11. In an underframe for an electric locomotive cab, a main central member, and lateral extensions thereon for supporting the cab structure, and brackets projecting from said central member intermediate said extensions, said extensions and brackets cooperating to carry ballast bars.

12. In an underframe for an electric locomotive cab, a main central member, and lateral extensions thereon for supporting the cab structure, and brackets projecting from said central member intermediate said extensions, said extensions and brackets cooperating to carry ballast bars, said brackets having vertical edges for engaging the sides of recesses in said bars to receive longitudinal thrusts from said bars independently of said extensions.

13. In a cab underframe for an electric locomotive, a main central member of hollow section having chambers for receiving ballast in bulk form, brackets on the exterior of said member for supporting ballast bars, and a sleeve extending through said chamber for receiving a ballast bar retaining bolt.

14. In combination with a cab underframe for an electric locomotive, having a central sill or like member, means depending from said sill to support an electric motor temporarily during the application and removal of a truck axle on which the motor is normally supported.

15. In a cab underframe for an electric locomotive, a central sill or like member, and a series of lugs integral with said member, at points aproximately over the position occupied by the locomotive axles, for attaching elements for supporting the locomotive motors when said axle are removed.

16. In a cab underframe for an electric locomotive, a box-like center member, portions of the walls of which comprise an air conduit extending between spaced inlet and outlet openings of substantial area in one or more of said walls, the walls surrounding said openings being thickened adjacent the openings and tapering to a less thickness as the wall extends away from the opening.

17. In a cab underframe for an electric locomotive, a hollow longitudinal main member adapted to be mounted on spaced trucks and having a box-shaped cross section with its walls provided with openings of substantial area at intervals, said walls being thickened at points adjacent to said openings to maintain a desired cross sectional area throughout the length of the member.

18. In a cab underframe for an electric locomotive, a bolster, a box-like center member extending on opposite sides of said bolster, said member comprising an air conduit having outlets to the locomotive motors on opposite sides of said bolster.

19. In a cab underframe for an electric locomotive, a bolster, a box-like center member extending on opposite sides of said bolster, said member comprising an air conduit extending longitudinally of the underframe, there being a plurality of outlets to the locomotive motors provided in said conduit-forming member at points spaced longitudinally of the frame.

20. In a cab underframe for an electric locomotive, a box-like longitudinal main central member having spaced center plate portions arranged to be carried on spaced trucks near its ends and to span the space between said trucks and carry the entire load between them, cab supports extending outwardly from said member and each comprising a single plate-like element projecting from the top wall of said member and a single plate-like element projecting outwardly from the lower wall of said member, and one or more vertical webs uniting said elements, the space between said supports being open from said member outwardly.

21. An integral structure forming an underframe for an electric locomotive and comprising a main central member, and spaced elements extending transversely from said member and including brackets for supporting ballast bars extending between said elements.

22. An integral structure forming an underframe for an electric locomotive and comprising a main central member, and spaced elements extending transversely from said member, said elements and said main member having integral brackets cooperating to carry ballast bars at said elements and intermediate said elements.

In testimony whereof I hereunto affix my signature this 31st day of December, 1929.

WILLIAM M. SHEEHAN.